March 7, 1961 E. W. BARTH ET AL 2,973,771
SHAFT SPEED LIMITING APPARATUS
Filed Feb. 4, 1959 2 Sheets-Sheet 1

INVENTORS
EUGENE W. BARTH and
JAMES R. SHIELDS
BY
Brown, Critchlow, Flick & Peckham
Their Attorneys March 7, 1961  E. W. BARTH ET AL  2,973,771
SHAFT SPEED LIMITING APPARATUS
Filed Feb. 4, 1959  2 Sheets-Sheet 2

INVENTORS
EUGENE W. BARTH and
JAMES R. SHIELDS
BY
Brown, Critchlow, Flick & Peckham
Their Attorneys United States Patent Office 2,973,771
Patented Mar. 7, 1961

2,973,771

SHAFT SPEED LIMITING APPARATUS

Eugene W. Barth, Verona, and James R. Shields, Pittsburgh, Pa., assignors to Carrier Corporation, Syracuse, N.Y., a corporation of Delaware Filed Feb. 4, 1959, Ser. No. 791,226

2 Claims. (Cl. 137—57)

This invention relates to apparatus for automatically limiting the maximum speed of rotating machinery, and more particularly to speed limiting apparatus suitable for use with shafts rotating at a speed in excess of 4000 revolutions per minute.

Many speed controls for rotating machinery are not suitable for use at high speeds, such as those in excess of 4000 revolutions per minute and as high as 100,000 r.p.m. Generally, there is too much friction in the controls. The friction varies not only with speed, but at the same speed on successive runs, thereby causing the controls to be quite erratic and unpredictable at high speed. Where coil springs are used in a speed control, the hysteresis effect also interferes with proper performance. Even where Belleville type springs have been used, they have not been designed properly for high speeds and cannot be depended upon to automatically resume their normal shape when the speed returns to normal.

It is among the objects of this invention to provide a centrifugal device for limiting the maximum speed of a high speed shaft, which has complete freedom of action, which has essentially no friction, which uses no mechanical linkage, which does not require the shaft to be drilled to receive it, which is accurate at speeds at least as high as 100,000 r.p.m., which can be mounted anywhere on the rotating shaft, and which is able to withstand the extreme stresses imposed upon it by centrifugal action.

The invention is illustrated in the accompanying drawings, in which

Figure 1:
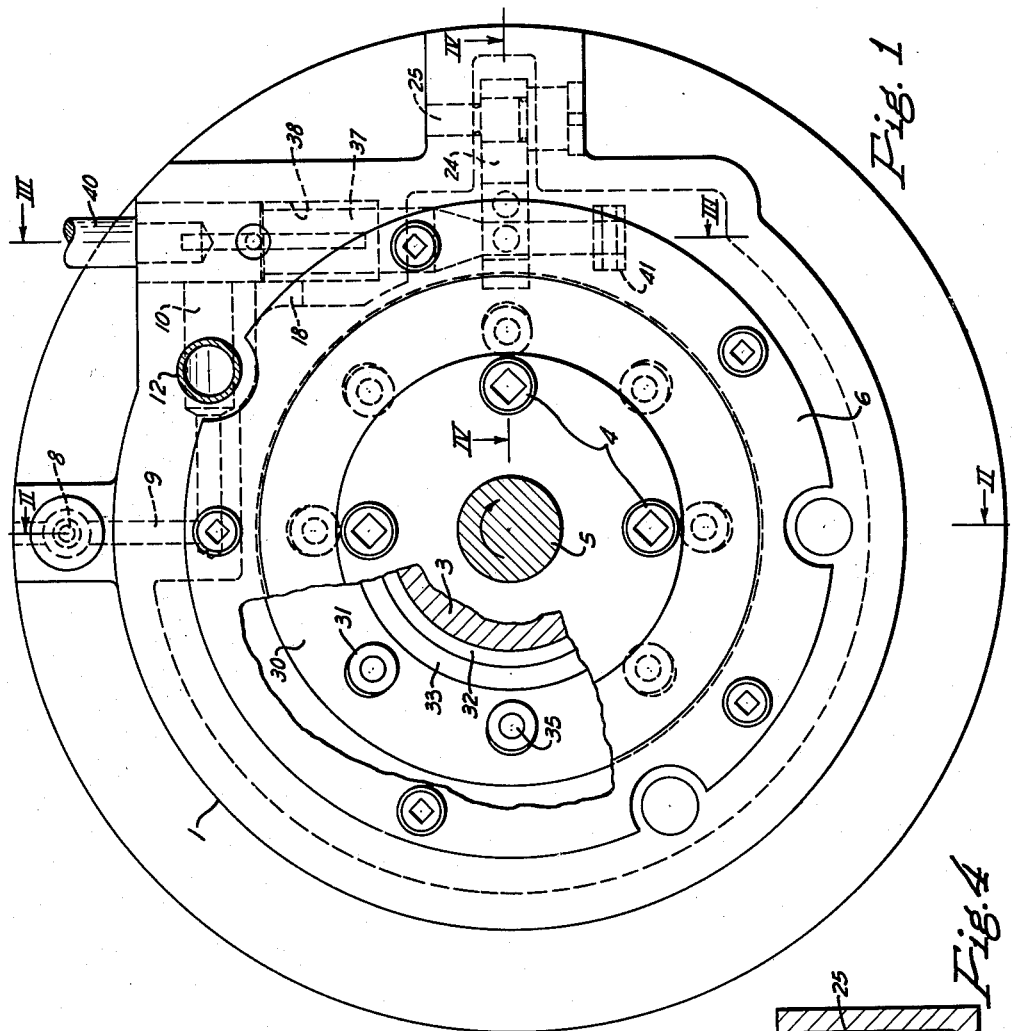
Fig. 1 is an end view, partly broken away, of a rotary machine incorporating our speed limiting apparatus.

Referring to Figs. 1 to 5 of the drawings, a control housing 1 is shown at one end of a rotary machine 2 of any desired type, such as a steam turbine. The turbine includes a rotary shaft 3 that extends into the control housing, where it is connected by bolts 4 to the flanged inner end of a shaft 5 that is driven by the turbine. The connection between the two shafts may be inside of a labyrinth seal 6 mounted in the outer end of the housing. A fluid inlet port 8 at the top of the housing leads to the top of a passage 9 which communicates at its lower end with the inner end of a horizontal passage 10. The outer portion of this latter passage has a lateral outlet 11 (Fig. 3) that is connected by a pipe 12 to fluid pressure responsive means controlling the power which drives the turbine. Thus, as shown diagrammatically in Fig. 3, in the case of a steam turbine the pipe 13 that delivers steam to it is controlled by a normally closed trip valve 14. Fluid under pressure, preferably oil, that has entered inlet port 8 fills passages 9 and 10 and pipe 12. A diaphragm 15, operatively connected with the valve stem, will cause the valve to open when fluid pressure is exerted against the diaphragm. This pressure is supplied through pipe 12 from control housing 1. As long as fluid pressure is on the diaphragm, the turbine will continue to run, but the moment the pressure is cut off the trip valve will close and the flow of steam to the turbine will stop or be reduced.

Figure 5:
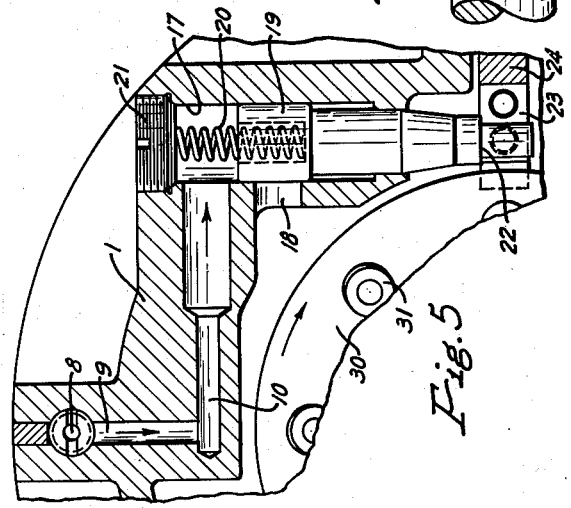
Fig. 5 is a fragmentary vertical section taken on the line V—V of Fig. 3.

It is a feature of this invention that means are provided for slowing down or stopping the turbine in case it starts to exceed a predetermined high speed. Accordingly, means are provided for automatically diverting the pressure fluid from passage 10 in case the turbine speed becomes excessive, so that the valve will close. For this purpose, as shown in Fig. 5, the outer end of the horizontal fluid passage 10 opens into the upper end of a vertical exhaust valve chamber 17 that has an outlet or exhaust port 18 a short distance below its inlet. Slidable vertically in this chamber is an exhaust valve 19 that is urged downward by fluid pressure on its top and also preferably by a coil spring 20 compressed between the top of the valve and a sealing plug 21 screwed into the upper end of the chamber. The valve extends down through the bottom of the chamber and has a reduced lower end connected to the part above it by a shoulder 22. This shoulder normally rests on top of a Stellite block 23 secured to the inner surface of one fork of a bifurcated arm 24 that is rotatably mounted on a vertical pivot pin 25 secured in the control housing. The block is urged laterally toward the reduced lower end of the exhaust valve by a coil spring 26. As long as the valve shoulder 22 rests on the block, the upper end of the valve closes exhaust port 18 and oil must therefore fill pipe 12 and press against diaphragm 15 to hold the trip valve open. In case the arm is swung away from the valve shoulder, the valve will quickly descend and connect the inlet and outlet of its chamber 17 so that oil will be diverted through the exhaust port and thus relieve the pressure on the diaphragm, whereupon the trip valve will close and the turbine will stop, or at least slow down.

To swing the arm 24 in order to permit the exhaust valve to open, novel speed responsive means is provided. This includes a Belleville type spring 30, which is shaped like a conical washer, encircling the shaft 3 in the housing. This control spring carries weights 31 which, under the influence of centrifugal force, will cause the spring to snap over (turn inside out) until a reduction in speed permits the spring to snap back to its original position. It is this movement of the spring that swings the arm to disengage it from the lower end of the exhaust valve.

Figure 2:
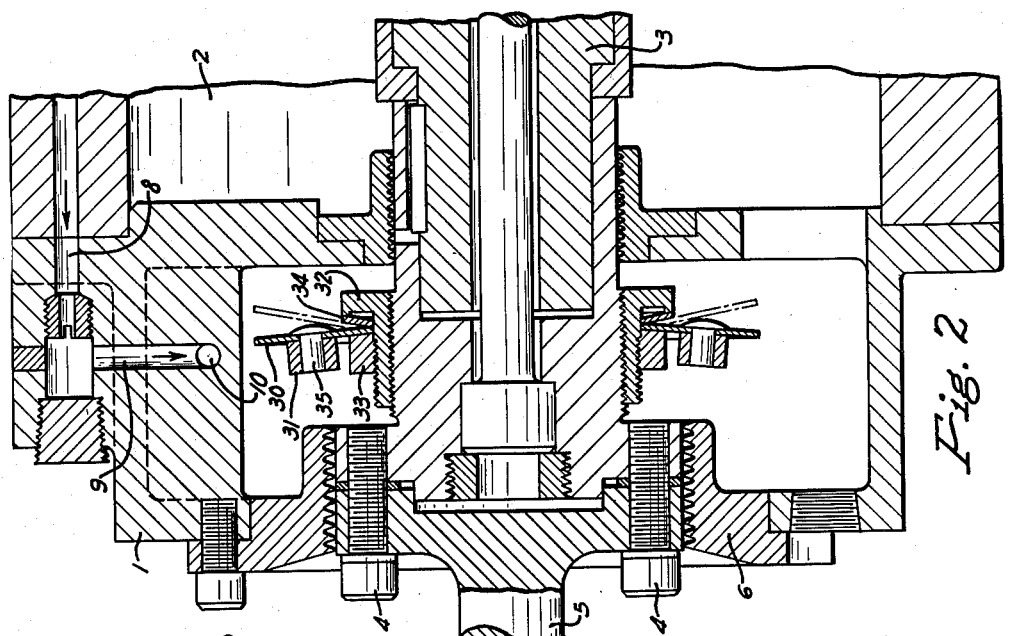

The dimensions, proportions and arrangements of the spring and weights are most important, if this speed control is to operate satisfactorily at the high speeds for which it is intended, which are shaft speeds in excess of 4000 revolutions per minute and as high as 100,000 r.p.m. One way of mounting the spring on the shaft is to position its inner portion between two axially spaced collars secured to the shaft, as shown in Fig. 2. For example, a long collar 32 may be screwed on the shaft and be provided with external threads on which a short collar 33 is screwed. The spring is located between the two collars and projects radially a considerable distance beyond them. Its inner edge nearly engages the base of the long collar but must not bind on it. The short collar is shown at the inner or concave side of the spring and fits against the inner part of the concave surface. The spring normally is held against this collar by a much smaller Belleville spring 34 on the opposite side. The inner edge of the small spring engages the adjoining side of the inner edge of the large spring, while the outer edge of the small spring engages the outer edge of the long collar. The small spring permits slight axial movement of the control spring's inner edge (like a floating pivot) when the large spring snaps over against the small spring, as indicated in dotted lines in Fig. 2. The friction between these various members is sufficient to cause the control spring to rotate with the shaft, but it will be seen that there is no interference with the snapping of the control spring in either direction.

The outer diameter of the control spring should be about twice as great as its inner diameter, and the depth of the concavity of the spring should be between 1.41 and 2.83 times its wall thickness. Otherwise, the spring either will not snap at all or will not snap back again automatically after it has once snapped over at high speed. The spring is provided with at least three uniformly spaced holes through it, arranged in a circle about midway between its outer and inner edges, which is where the stress level on the spring is lowest. More than three holes are preferred, however; eight being a suitable number. On the other hand, there should not be so many holes that they would have to be less than ½ inch apart because that would break the tangential continuity of the spring. Extending through each hole is a fastener, such as a rivet 35, and a separate weight 31 is connected by each fastener to the concave side of the spring. For the best results, the number of weights is 7½ times the inside diameter of the control spring measured in inches. In other words, if the inside diameter of the spring is four inches, there should not be over 30 weights, and it may not be possible to have that many because the minimum distance between the weights should be at least as great as their maximum transverse dimension, which in the case of cylindrical weights is their diameter. Each weight has a length between ½ and 1½ its maximum transverse dimension.

Figure 4:
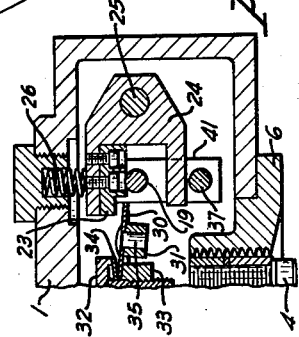
Fig. 4 is a fragmentary horizontal section taken on the line IV—IV of Fig. 1.

With a spring device made in this manner, the control spring will snap over to high speed position when the shaft starts to exceed a predetermined maximum speed, and it will snap back again when the speed is reduced. As shown in Fig. 4, the outer edge of the spring projects a short distance between the forks of arm 24 in such a position that when the spring snaps over at high speed, it will strike the Stellite block 23 and swing the arm clockwise far enough to move the block out from beneath the exhaust valve shoulder 22. The valve will then drop and open the exhaust port 18. The tapered portion of the valve above its shoulder immediately moves block 23 away from the rotating spring, thereby holding contact time between block and spring to a minimum and reducing wear at their contact surfaces.

Figure 3:
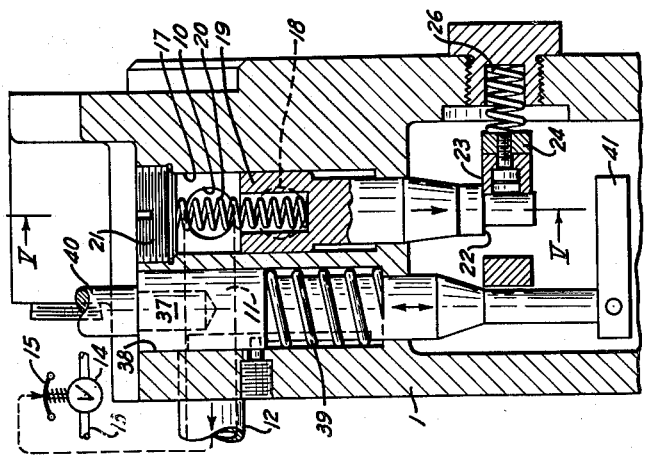
Figs. 2 and 3 are fragmentary vertical sections taken on the lines II—II and III—III, respectively, of Fig. 1.

In order to reset the exhaust valve 19, manually operable means are provided. As shown in Fig. 3, this may take the form of a plunger 37 slidably mounted in a bore 38 parallel to exhaust chamber 17 and close to it. The plunger is normally held in the intermediate position shown by means of a coil spring 39. From this position the plunger can be moved either down or up. Projecting from the top of the plunger is a handle 40, by which the plunger can be actuated. When the plunger is raised, a finger 41 projecting from its lower end beneath exhaust valve 19 is raised in order to lift the valve until coil spring 26 swings arm 24 back beneath valve shoulder 22. The plunger can then be allowed to drop to its normal position. By providing the plunger with a downwardly tapered portion beside and above the side of the arm farthest from spring 26, the arm can be swung toward the spring by pressing handle 40 down to cause the plunger to engage the arm and force it laterally. This permits the trip valve 14 to be controlled manually when desired.

Figure 7:
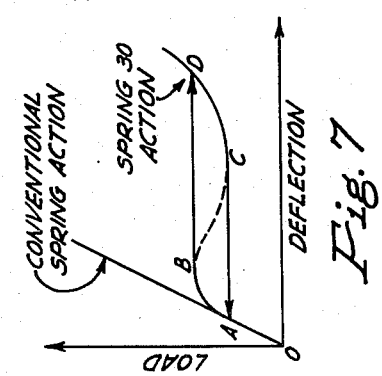
Fig. 7 is a diagram illustrating how the control spring deflects under load.

Figure 7 shows that as the load on an ordinary spring increases, the deflection gradually increases quite uniformly. There is no snap action. With the speed control spring described herein, deflection occurs more or less uniformly until the load on the spring, due to the speed of the shaft on which it is mounted, reaches a predetermined value that is not to be exceeded. At that point the spring snaps over center, which means it deflects a long distance without increase in applied load, and in doing so it cuts off the power to the shaft. Thus, in the diagram the control spring moves from B to D without increase in load (speed). This is a very desirable characteristic for any overspeed trip, and is an essential requirement of the one disclosed herein. When the speed of the shaft starts to decrease, thereby reducing the load on the spring, the spring will snap back from C to A without further reduction in load. The spring therefore resets itself automatically.

It will be observed that this speed control device has no mechanical linkage, and no friction to overcome, which would interfere with its tripping accuracy. There is complete freedom of action. The whole radial depth of the spring is effective in its operation, for the weights engage the spring in small localized areas of minimum stress level and therefore have no variable stiffening effect on the spring. The spring can be mounted anywhere on the shaft where there is room, and the shaft does not have to be specially prepared to receive it.

Figure 6:
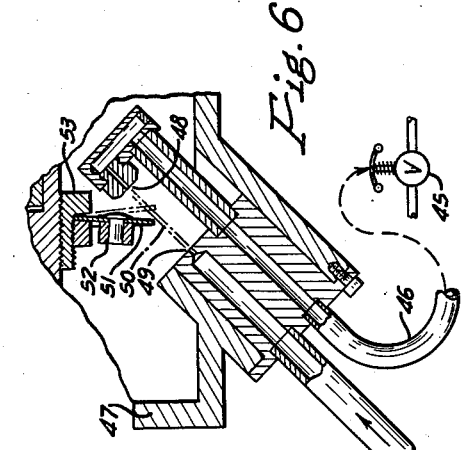
Fig. 6 is a fragmentary horizontal section through a modification of this invention.

In the embodiment of the invention shown in Fig. 6, the trip valve 45 for operating the turbine is controlled by fluid pressure in a conduit 46 that extends into the control housing 47 and has an inlet orifice 48 facing the outlet of a fluid pressure nozzle 49. Fluid from this nozzle is projected in a jet 50 across a short open space and into the orifice. This builds up and maintains pressure in the conduit to keep the trip valve open and the machine operating. However, close beside the jet there is a Belleville control spring 51 with weights 52 like the one just described. If the speed of the rotating machine starts to become excessive, the spring will snap over to high speed position (shown in dotted lines) and in doing so it intercepts and interrupts the fluid jet and thereby prevents it from entering orifice 48. The pressure in conduit 46 therefore immediately falls and the trip valve closes to shut off power to the machine until it slows down enough to permit the spring to snap back to low speed position. The jet then will enter the orifice again and build up pressure to open the trip valve.

Figure 6 also shows the control spring held in place without the use of a small spring like 34 in Fig. 2. Instead the large collar 53 is shaped to substantially engage one side of the inner edge of the spring and not to interfere with its snapping over against that collar at high speed.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A governing apparatus including a shaft rotating at a speed in excess of 4000 revolutions per minute, a Belleville control spring encircling the shaft in a location where it is free to snap over from a low speed position to a high speed position and back again, collars rigidly mounted on the shaft at opposite sides of the spring, one of the collars normally engaging the inner area of the concave side of the spring and the other collar being spaced from the spring, a small Belleville spring loosely mounted on the shaft between the other spring and the spaced collar, the inner edges of the two springs being in engagement with each other and the outer edge of the small spring engaging said spaced collar, the outer diameter of the control spring being about twice as great as its inner diameter, the depth of the concavity of the control spring being between 1.41 and 2.83 times its wall thickness, the control spring being provided with at least three uniformly spaced holes in a circle about midway between its inner and outer edges, said holes being at least one-half inch apart, a fastener mounted in each hole, and a separate weight connected to the concave side of the control spring by each fastener, the minimum distance between weights being at least as great as their maximum transverse dimension and each weight having a length between one-half and one and one-half said transverse dimension, whereby the control spring will snap over to high speed position when the shaft starts to exceed a predetermined maximum speed and will snap back when the speed is reduced.

2. A governing apparatus including a power driven shaft rotating at a speed in excess of 4000 revolutions per minute, an exhaust valve urged toward open position, a movable stop normally holding the valve closed, the valve being movable axially between closed and open positions, a Belleville spring mounted on the shaft in a location where it is free to snap over from a low speed position to a high speed position and back again, and at least three uniformly spaced weights mounted on the concave side of the spring in a circle about midway between its inner and outer edges, the spring and weights being so proportioned and related that the spring will snap over when the shaft starts to exceed a predetermined maximum speed and will snap back when the speed is reduced again, and the outer edge of the spring being disposed beside said stop in a position to move it away from said valve when the spring snaps over at high speed, whereby the valve will open, said valve having a tapered portion that will move said stop away from said spring when the valve opens.

References Cited in the file of this patent

UNITED STATES PATENTS

| | | |
|---|---|---|
| 891,282 | McHugh | June 23, 1908 |
| 1,049,802 | Bentley | Jan. 7, 1913 |
| 1,713,148 | Schild | May 14, 1929 |
| 1,961,813 | Caughey | June 5, 1934 |
| 2,328,451 | Hedman | Aug. 31, 1943 |
| 2,333,044 | Rosch | Oct. 26, 1943 |
| 2,476,056 | Martin | July 12, 1949 |
| 2,616,682 | Greenhut | Nov. 4, 1952 |
| 2,922,000 | Larsh | Jan. 19, 1960 |

FOREIGN PATENTS

| | | |
|---|---|---|
| 915,528 | Germany | July 22, 1954 |
| 946,589 | Germany | Aug. 2, 1956 |